United States Patent [19]

Fredericks et al.

[11] Patent Number: 5,151,977
[45] Date of Patent: Sep. 29, 1992

[54] MANAGING A SERIAL LINK IN AN INPUT/OUTPUT SYSTEM WHICH INDICATES LINK STATUS BY CONTINUOUS SEQUENCES OF CHARACTERS BETWEEN DATA FRAMES

[75] Inventors: Kenneth J. Fredericks, Poughkeepsie; Kenneth R. Lynch, Rhinebeck, both of N.Y.

[73] Assignee: International Business Machines Corp., Armonk, N.Y.

[21] Appl. No.: 575,923

[22] Filed: Aug. 31, 1990

[51] Int. Cl.⁵ .......................... H04L 7/00; G06F 3/04; G06F 15/16; G06F 11/20
[52] U.S. Cl. ........................... 395/200; 364/242.95; 364/260.1; 364/265.1; 364/265.5; 364/266; 364/264.6; 364/926.3; 364/940.4
[58] Field of Search ... 364/200 MS File, 900 MS File; 395/200

[56] References Cited

U.S. PATENT DOCUMENTS

| | | | |
|---|---|---|---|
| 4,200,930 | 4/1980 | Rawlings et al. | 364/200 |
| 4,202,035 | 5/1980 | Lane | 364/200 |
| 4,241,398 | 12/1980 | Carll | 364/200 |
| 4,292,669 | 9/1981 | Wollum et al. | 364/200 |
| 4,425,616 | 1/1984 | Woodell | 364/200 |
| 4,446,515 | 5/1984 | Sauer et al. | 364/200 |
| 4,468,734 | 8/1984 | Lanier | 364/200 |
| 4,613,979 | 9/1986 | Kent . | |
| 4,675,864 | 6/1987 | Bliek et al. | 370/85 |
| 4,972,368 | 11/1990 | O'Brien et al. | 364/900 |

FOREIGN PATENT DOCUMENTS

| | | |
|---|---|---|
| 8700371 | 1/1987 | European Pat. Off. . |
| 0352028 | 7/1989 | European Pat. Off. . |
| 0425779 | 8/1990 | European Pat. Off. . |
| 0429786 | 9/1990 | European Pat. Off. . |

OTHER PUBLICATIONS

IBM Technical Disclosure Bulletin, vol. 32, No. 10A, Mar. 1990, pp. 333-334, Combining Control Information with Data to Insure Accurate Data Transmission and Reception Across an Asynchronous Channel Interface.

Primary Examiner—Dale M. Shaw
Assistant Examiner—Robert S. Hauser
Attorney, Agent, or Firm—Floyd A. Gonzalez

[57] ABSTRACT

A link-level facility for managing the transmission of frames and continuous sequences of control characters over a link. The link-level facility includes a state machine which has a first state for allowing transmission of a frame over the link where a link-level facility at the other end of the link indicates that the link has a frame-transmitting status, and a second state for preventing the transmission of frames over the link when the link-level facility at the other end of the link has indicated that the link has a non-frame-transmitting status. The link-level facilities signal the status of the link by means of continuous sequences of special characters intermediate frames transmitted over the link such that synchronism is maintained. The first state includes an inactive state and a working state, and the second state includes a link-failure state, and connection-recovery state and an off-line state.

9 Claims, 5 Drawing Sheets

| FIG. 7A |
| FIG. 7B |
| FIG. 7C |

FIG. 7A

| | | STATES | | | | | | | | | |
|---|---|---|---|---|---|---|---|---|---|---|---|
| | | INAC-TIVE | WORK-ING | LINK FAILURE | | CONNECTION RECOVERY | | | OFFLINE | | |
| EVENTS | | (IN) | (WK) | XMIT OLS (LF1) | XMIT NOS (LF2) | UD XMIT (CR1) | UD RECPTN. (CR2) | UDR RECPTN. (CR3) | OFFLINE XMIT & (OL1) | OFFLINE RECV'D (OL2) | WAIT FOR OLS (OL3) |
| 1 | TAKE LINK-LEVEL FAC. OFFLINE | OL1 (5) | OL1 (5) NOTE#1 | OL1 (5) | OL1 (5) | OL1 (5) | OL1 (5) | OL1 (5) | * | OL1 (5) | OL1 (5) |
| 2 | OLS RECOGNIZED | OL2 (4) | OL2 (4) | OL2 (4) | OL2 (4) | OL2 (4) | OL2 (4) | OL2 (4) | OL2 (4) | * | OL2 (4) |
| 3 | NOS RECOGNIZED | LF1 (5) | LF1 (5) | * | LF1 (5) | LF1 (5) | LF1 (5) | LF1 (5) | LF1 (5) | LF1 (5) | LF1 (5) |

FIG. 7B

| | | 1 | 2 | 3 | 4 | 5 | 6 | 7 | 8 | 9 | 10 |
|---|---|---|---|---|---|---|---|---|---|---|---|
| 4 | UD RECOGNIZED | CR2 (2) | CR2 (2) | CR2 (2) | * | CR2 (2) | CR2 (2) | CR2 (2) | CR2 (2) | CR2 (2) | LF2 (6) |
| 5 | UDR RECOGNIZED | CR3 (1,3) | CR3 (1,3) | * | * | CR3 (3) | CR3 (3) NOTE#2 | * | * | CR3 (3) | LF2 (6) |
| 6 | IDLE CHARACTERS RECOGNIZED | * | * | * | * | * | IN (3) NOTE#3 | IN (3) | * | * | * |
| 7 | FRAME RECEPTION | WK OR CR1 NOTE#4 | * NOTE#4 | * | * | * | * | ¢ | * | * | * |
| 8 | FRAME TRANSMISSION | WK OR CR1 NOTE#4 | * NOTE#4 | - | - | - | - | - | - | - | - |
| 9 | TEMPORARILY LINK BUSY | WK (3) | - | - | - | - | - | - | - | - | - |

| | | | | | | | | | |
|---|---|---|---|---|---|---|---|---|---|
| 10 | NO LONGER LINK BUSY | – | IN (3) | – | – | – | – | – | – | – |
| 11 | LINK-SIGNAL ERROR FOR ≥ LINK-INTERVAL DURATION | LF2 (6) | LF2 (6) | LF2 (6) | * | LF2 (6) | LF2 (6) | LF2 (6) | OL3 (6) | OL3 (6) |
| 12 | LINK-INTERVAL DURATION ELAPSED | – | – | LF2 (6) NOTE#5 | – | LF2 (6) | LF2 (6) | LF2 (6) | OL3 (6) | OL3 (6) NOTE#6 |
| 13 | PERFORM CONNECTION RECOVERY | CR1 (4) | CR1 (4) | – | – | – | – | – | – | – |

FIG. 7C

MANAGING A SERIAL LINK IN AN INPUT/OUTPUT SYSTEM WHICH INDICATES LINK STATUS BY CONTINUOUS SEQUENCES OF CHARACTERS BETWEEN DATA FRAMES

BACKGROUND OF THE INVENTION

The present invention relates to managing a serial link in a data processing input/output (I/O) system, and more particularly relates link-level facilities on each end of a serial link which manage the link for the transfer of data therebetween.

Data processing I/O systems are known in which data and commands are formatted into frames or packets and which are transmitted over links between channels and peripheral control units. U.S. Pat. No. 4,241,398 issued Dec. 23, 1980 to Carll for "Computer Network, Line Protocol System" discloses a line protocol format for the asynchronous exchange of digital signal information between processing units in a supervisory control system having a central processing unit and at least one remote processing unit.

U.S. Pat. No. 4,446,515 issued May 1, 1984 to Sauer et al. for "Passive Bus System for Decentrally Organized Multi-Computer Systems" discloses a passive bus system for a decentrally organized multi-bus computer system incorporating exclusively optical transmission means for data exchange operations wherein the data is formatted into information packets separated by pauses having adjustable lengths.

U.S. Pat. No. 4,675,864 issued Jun. 23, 1987 to Bliek et al. for "Serial Bus System" discloses a serial bus system in which frames are sent from a central system to a plurality of substations over a first conductor and information is sent from the substations to the central station over a second conductor. Each transmitted frame contains bits identifying whether the frame is for an address, data or a command.

SUMMARY OF THE INVENTION

The prior art does not include a universal apparatus for managing a serial link wherein the apparatus has a first state in which frames may be transmitted over the link, and a second state in which frames are not transmitted over the link. The apparatus includes a state machine which controls the receiving of either frames separated by a continuous sequence of idle characters or continuous sequences of special characters which control the states of the state machine, thereby controlling the status of the link to be managed.

The present invention provides for managing a link in an I/O system by means of a link-level facility at each end of the link. Each link-level facility includes a state machine which has a first state for allowing transmission of a frame over the link when the link-level facility at the other end of the link has indicated that the link has a frame-transmitting status, and a second state for preventing the transmission of frames over the link when the link-level facility at the other end of the link has indicated that the link has a non-frame-transmitting status. The link-level facilities signal the status of the link by means of continuous sequences of special characters intermediate frames transmitted over the link such that synchronism is maintained.

It is an object of the present invention to manage a link between a pair of link-level facilities by indicating by means of a state machine in each link-level facility the state of the link.

It is a further object of the present invention to provide a link-level facility for managing a link by transmitting over the link to a second link-level facility, the status of the link.

It is a further object of the present invention to manage a link by placing the link in either a frame-transmitting status wherein frames separated by a continuous sequence of idle characters may be transmitted over the link, or a non-frame-transmitting status wherein continuous sequences are transmitted over the link.

It is a further object of the present invention to maintain a link between two link-level facilities in synchronism by continuously transmitting characters of one of the frames or continuous sequences of special characters.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
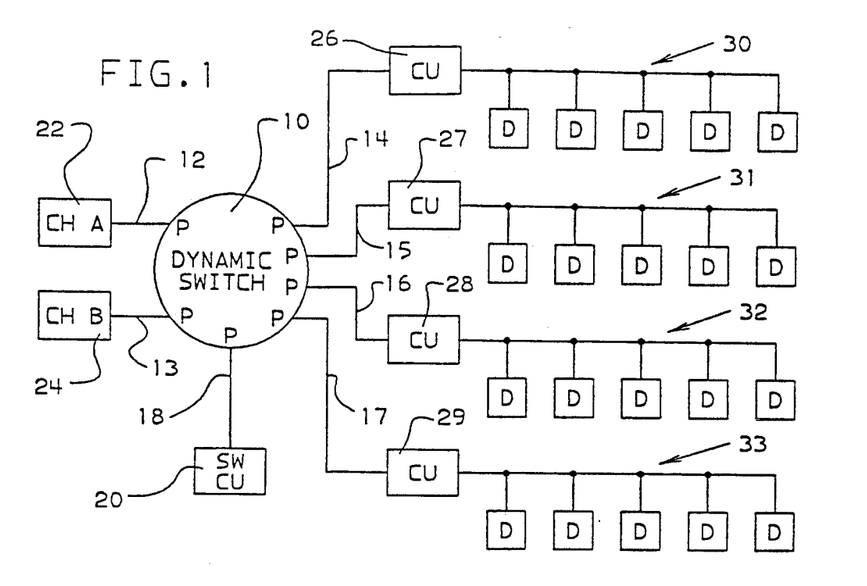
FIG. 1 is a block diagram of a computer input/output system for use with the present invention, the input/output system having a plurality of links connected to a link-level facility of either a channel or a control unit at one end and a dynamic switch at the other end.

FIG. 1 is a block diagram of the I/O system of a data processing system for making dynamic connections between the channel subsystem of the data processing system and control units. The I/O system includes a dynamic switch 10 having a plurality of ports P, each port P attached to one end of a plurality of links 12–18. One of the links 18 is attached to a dynamic-switch control unit 20, and each of the other links 12–17 is attached to either a channel, such as channel A designated 22 or channel B designated 24, or to one of the control units 26–29. Each of the control units 26–29 control a plurality 30–33 of peripheral devices D, respectively.

Each of the channels 22 and 24 is a single interface on a channel subsystem, such as, for instance, an ESA/370 channel subsystem. The channels 22 and 24 direct the transfer of information between I/O devices of the pluralities 30–33 of devices D and main storage (not shown) of the data processing system and provide the common controls for the attachment of different I/O devices D by means of a channel path (to be defined). The channels 22 and 24 are channels wherein data is transmitted and received in a frame, as will be explained.

Each of the links 12-17 is a point-to-point pair of conductors that may physically interconnect a control unit and a channel, a channel and a dynamic switch (such as links 12 and 13), a control unit and a dynamic switch (such as links 14-17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in U.S. Pat. Nos. 4,605,928; 4,630,045; and 4,635,250. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic-switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in copending patent application Ser. No. 07/429,267 filed Oct. 30, 1989 entitled "Switch and Its Protocol for Making Dynamic Connections".

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

Figure 2:
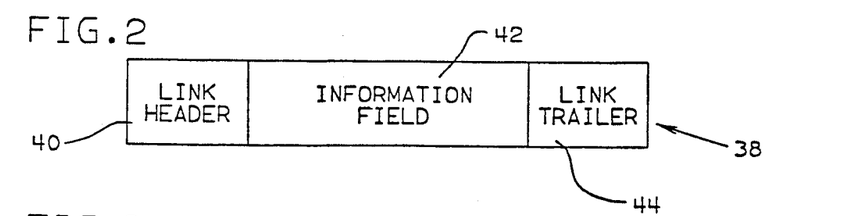
FIG. 2 is an illustration of a frame transmitted over a link of the system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by link-level protocols which provide for making the connection through the dynamic switch 10 and for other control functions. Each channel and each control unit contains a link-level facility, which is the embodiment of the link protocols.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

Figure 3:
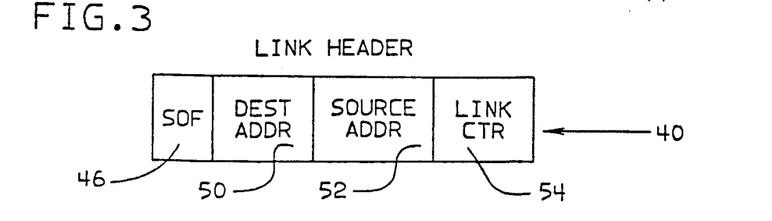
FIG. 3 is an illustration of a link header of the frame of FIG. 2.
Figure 4:
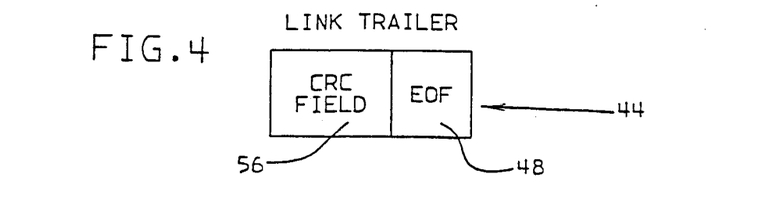
FIG. 4 is an illustration of a link trailer of the frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, assigned by the assignee of the present invention. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame of future request frames to the same link-level facility.

The link-control field 54 indicates the type and format of the frame. The link-control field 54, which is the last field of the link header 40, immediately follows the source-address field 52.

The information field 42 is the first field following the link header 40. The size of the information field depends on the function performed by the particular frame. A reason code, for instance, is transmitted in the information field 42 of response frames.

The link trailer 44 of FIG. 4 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific sequence of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Figure 5:
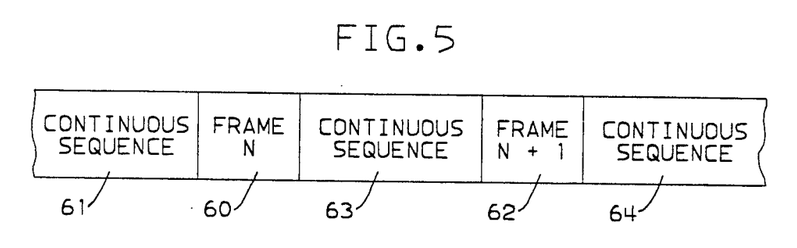
FIG. 5 is an illustration of a train of frames separated by continuous sequences of idle characters transmitted over a link of the system of FIG. 1.

When in a frame transmitting status, a continuous sequence of idle characters is sent over the links when frames are not being transmitted. These idle characters are special characters not having data values. When in the non-frame-transmitting status, continuous sequences of modified idle characters are transmitted to provide limited communication of special commands such as unconditional-disconnect and unconditional-disconnect response. FIG. 5 shows transmission during the frame-transmitting status wherein a train of frames, such as frame N 60 and frame N+1 62, are inserted between continuous sequences of idle characters 61, 63 and 64. It will be understood that when in the non-frame-transmitting status, the transmissions only contain continuous sequences of idle or modified idle characters.

The link-level facilities of the control units 26–29 and the channels 22 and 24 each include apparatus for receiving frames and for generating frames. The apparatus for receiving frames may be as described in copending U.S. Pat. No. 5,025,458 issued Jun. 18, 1991 for "Apparatus for Decoding Frames From a Data Link", and the apparatus for generating frames may be as described in patent application U.S. Serial No. 428,798, both owned by the assignee of the present invention. The continuous sequences of modified idle characters may be as those described in U.S. Pat. No. 5,048,062 issued Sep. 10, 1991 for Transmitting Commands Over a Serial Link, owned by the assignee of the present invention.

Figure 6:
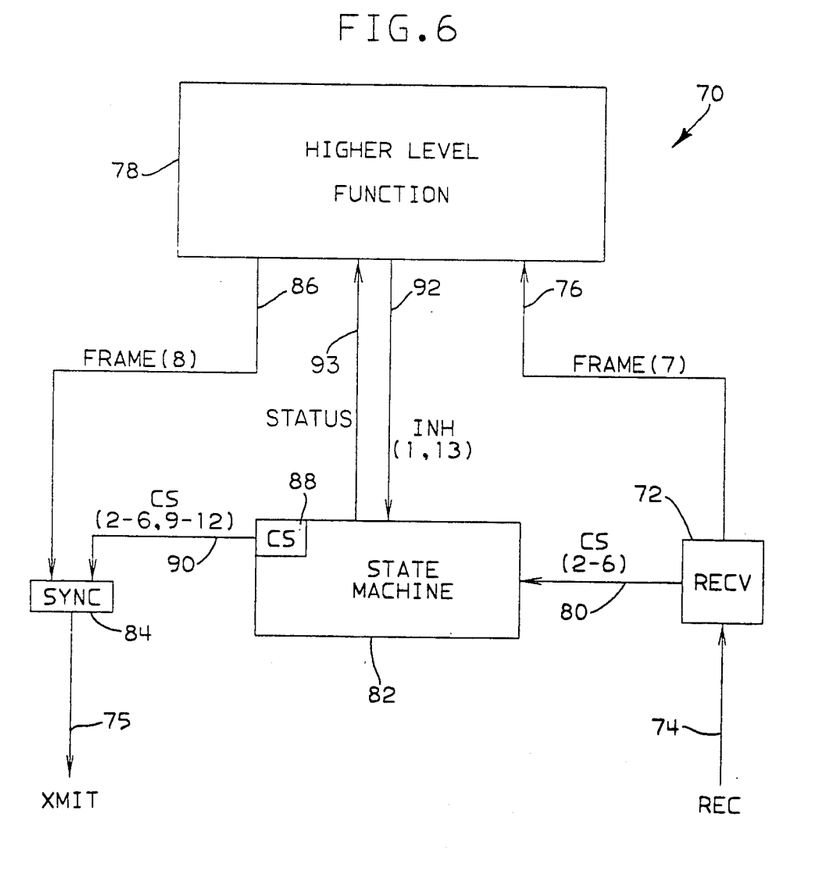
FIG. 6 is a diagram of a link-level facility of the system of FIG. 1.

FIG. 6 is a block diagram of a link-level facility 70 of one of the channels or control units of FIG. 1. The link level facility 70 includes a receiver 72 for receiving transmissions from one of the conductors 74 in a link, such as links 12–17 of FIG. 1. The other conductor 75 of the link carries signals transmitted from the link-level facility, as will be explained.

The receiver 72 may receive either frames or continuous sequences transmitted over conductor 74. The frames are transmitted over conductor 76 to a higher level function 78, and the continuous sequences are sent over conductor 80 to a state machine 82. The higher level function 78 does such functions as reading and writing data, and sending and receiving control frames over the link to which the link-level facility 70 is connected.

The higher level function 78 sends frames to a synchronizer 84 over a conductor 86 for transmitting the frames over conductor 75. The synchronizer 84 is also connected to a continuous sequence generator 88 in the state machine 82 by a conductor 90.

It will be understood that when in the frame-transmitting status, the synchronizer 84 synchronizes the transmission of frames from conductor 86 and the continuous sequence of idle characters over conductor 90 such that the continuous sequence of idle characters is inserted between the frames as shown in FIG. 5. The synchronizer 84 may be similar to that disclosed in U.S. Pat. No. 5,003,558 issued Mar. 26, 1991 for "Data Synchronizing Buffers for Data Processing Channels" owned by the assignee of the present invention.

During certain events, the channel or control unit determines that its link-level facility 70 is to be taken off line or that connection recovery is to be started. This is shown by an inhibit line 92 from the higher level function 78 to the state machine 82. The event numbers (to be explained) for the events which use the conductor 76, 80, 86 and 90 are shown in FIG. 6. The state machine 82 indicates over conductor 93 to the higher level function 78, the status of the link is either a frame-transmitting status or a non-frame-transmitting status. When the status on conductor 93 is the non-frame-transmitting status, the higher level function 78 does not generate frames.

Figures 7, 7A:
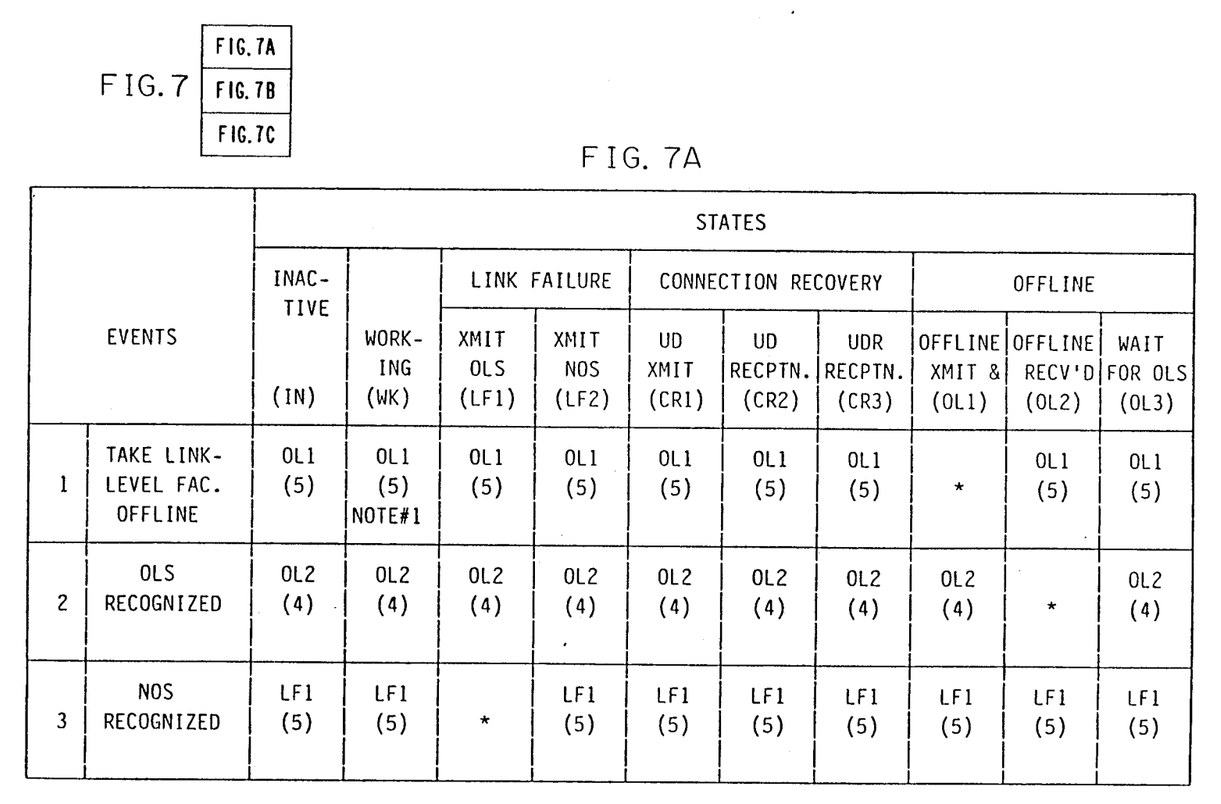
FIGS. 7A, 7B and 7C, arranged as shown in FIG. 7, form a state diagram of a state machine of the link-level facility of FIG. 6.
Figure 7B:
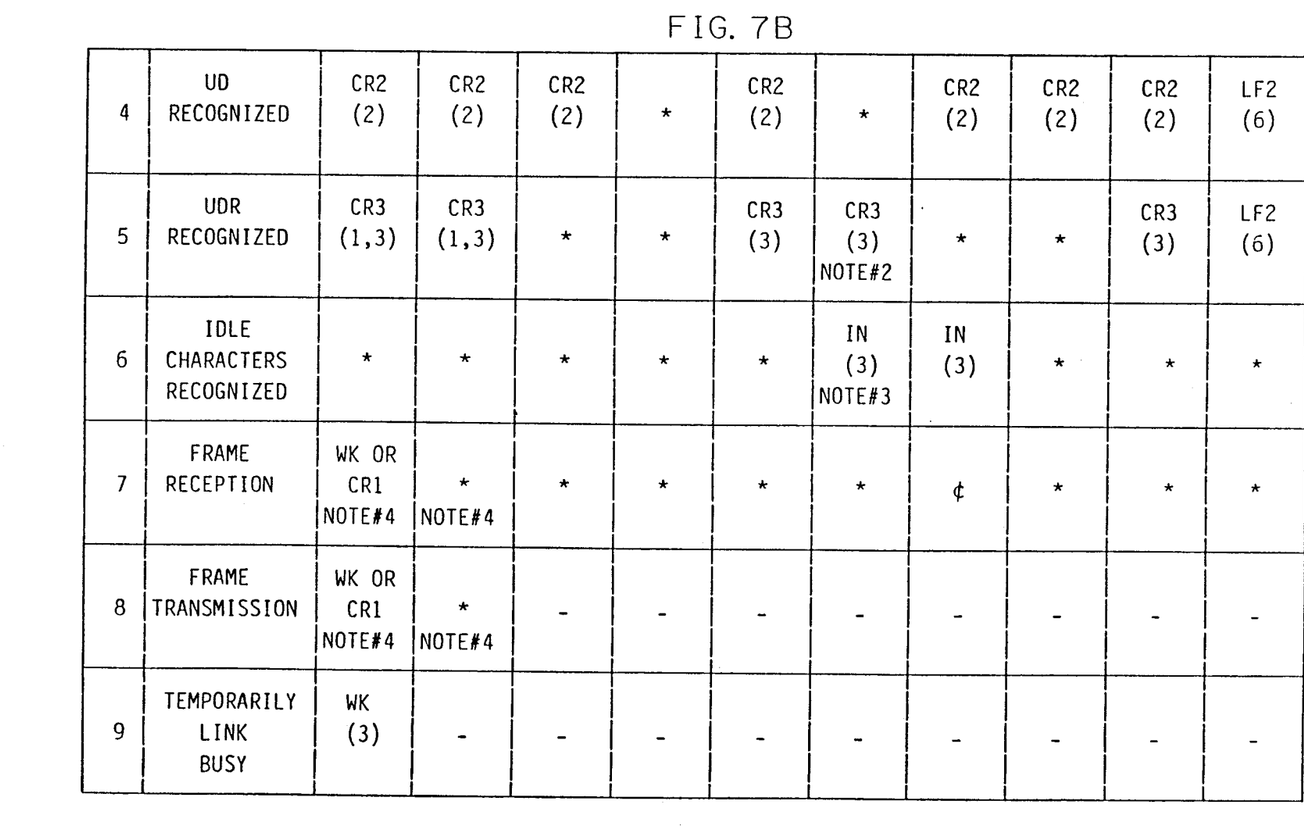
Figure 7C:
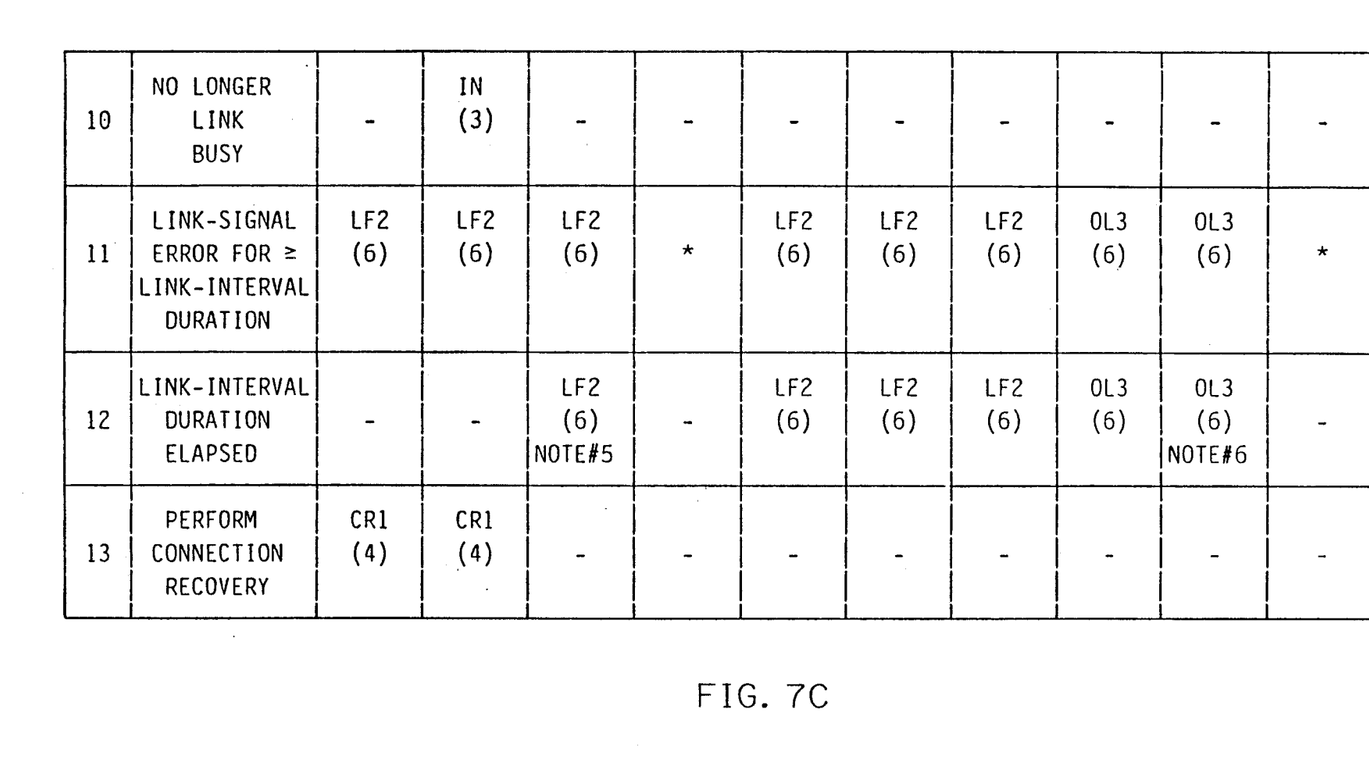

FIG. 7 is a state diagram showing the events, states and actions of the link-level facility 70. The events of the link-level facility 70 are shown down the left side of the state diagram. The events are:

1. The channel or control unit has determined that the link-level facility 70 is to be taken off-line.

2. The Off-Line Sequence (OLS) from the link is recognized.

3. The Not-Operational Sequence (NOS) from the link is recognized.

4. The Unconditional Disconnect (UD) sequence from the link is recognized.

5. The Unconditional-Disconnect-Response (UDR) sequence from the link is recognized.

6. Idle character(s) from the link recognized.

7. Frame reception was started and the extent of the frame was established.

8. The link-level facility 70 causes a frame to be transmitted.

9. The link-level facility 70 has determined that it is temporarily unable to allow two way communication, that is, link busy.

10. The link-level facility 70 has determined that it is able to allow a new communication path to be established, that is, no longer link busy.

11. Link failure recognized due to link-signal error persisting for longer than the link-interval duration.

12. The link-interval duration elapsed since transmitting a particular sequence and none of the allowable response sequences are recognized for the conditions present.

13. The link-level facility has determined that connection recovery is to be performed.

In event 7, frames are being received from the link over 74 by the receiver 72 and sent via conductor 76 to the higher level function 78, and in event 8, frames being sent from the higher level function 78 to the synchronizer 84 via conductor 86 and transmitted to the link over 75. In events 2 through 6, continuous sequences are received over 74, and in events 2-6 and 9-12 continuous sequences are sent from the continuous sequence generator 88 to the synchronizer 84 via conductor 90 for transmission over the link conductor 75. The link-level facility 70 determines by these events if the link is in one of a frame-transmitting mode or a non-frame-transmitting mode.

The states of the state machine are shown in the columns under the headings of the state diagram of FIG. 7. When performing the management function of the attached link, a link-level facility can be in one of the following mutually exclusive states:

Inactive (IN)
Working (WK)
Link Failure
   Transmit OLS (LF1)
   Transmit NOS (LF2)
Connection Recovery
   UD-Transmission (CR1)
   UD-Reception (CR2)
   UDR-Reception (CR3)
Offline
   Offline Transmit (OL1)
   Offline Received (OL2)
   Wait-for-Offline Sequence (OL3)

The state of the link-level facility 70 determines the actions to be taken when the specific events 1-13 occur. These events include information received from the link, information to be transmitted on the link, and link-level facility initiated operations.

The following is a description of each link-level-facility state and the events that affect the state, including conditions for leaving that state.

INACTIVE STATE (IN)

The link-level facility is in the inactive (IN) state when it is not in any of the other states. When the link-level facility is in the inactive state, the link-level facility transmits idle characters on the link and can initiate monolog communication. The link-level facility can enter the inactive state from the working (WK) state or the connection-recovery UD-reception (CR2) or UDR-reception (CR3) state.

When the process of frame reception or frame transmission has been completed and monolog communication is considered to exist, the link-level facility changes from the inactive (IN) state to the working (WK) state.

When a link-level facility has determined that it is temporarily unable to establish a two-way communication path, that is, link busy, the link-level facility changes from the inactive (IN) state to the working (WK) state.

When the link-level facility has determined that it is to be taken offline and initiates the offline operation, the link-level facility changes from the inactive (IN) state to the offline-transmit (OL1) state.

When the link-level facility has determined that connection recovery is to be performed and initiates the connection-recovery operation, the link-level facility changes from the inactive (IN) state to the connection-recovery UD-transmission (CR1) state.

When the link-level facility has recognized the offline sequence, the link-level facility changes from the inactive (IN) state to the offline-received (OL2) state.

When the link-level facility has recognized the not-operational sequence, the link-level facility changes from the inactive (IN) state to the link-failure transmit-OLS (LF1) state.

When the link-level facility has recognized the unconditional-disconnect sequence, the link-level facility changes from the inactive (IN) state to the connection-recovery UD-reception (CR2) state.

When the link-level facility has recognized the unconditional-disconnect-response sequence, the link-level facility changes from the inactive (IN) state to the connection-recovery UDR-reception (CR3) state.

When the link-level facility has determined that a link-signal error persists for longer than the link-interval duration, the link-level facility changes from the inactive (IN) state to the link-failure transmit NOS (LF2) state.

WORKING STATE (WK)

The link-level facility is in the working (WK) state when the link-level facility has performed either the process of frame reception or frame transmission and considers that monolog communication or dialog communication has occurred, or the link-level facility is link busy. Monolog communication is considered to exist when a two-way communication path is being established by the initial transmission or reception of an initiation frame. Dialog communication is considered to exist when a two-way communication path is established by the proper frame transmission or frame reception to a received or transmitted initiation frame, respectively. When the link-level facility considers the link to be in the working (WK) state, the link-level facility transmits idle characters on the link when it is not transmitting frames on the link. The link-level facility can enter the working (WK) state only from the inactive (IN) state.

When the link-level facility does not have a monolog communication or a dialog communication condition and the link-level facility is not link busy, the link-level facility changes from the working (WK) state to the inactive (IN) state.

When the link-level facility has determined that it is to be taken offline and initiates the offline operation, the link-level facility changes from the working (WK) state to the offline-transmit (OL1) state.

When the link-level facility has determined that connection recovery is to be performed and initiates the connection-recovery operation, the link-level facility changes from the working (WK) state to the connection-recovery UD-transmission (CR1) state.

When the link-level facility has recognized the offline sequence, the link-level facility changes from the working (WK) state to the offline-received (OL2) state.

When the link-level facility has recognized the not-operational sequence, the link-level facility changes from the working (WK) state to the link-failure transmit-OLS (LF1) state.

When the link-level facility has recognized the unconditional-disconnect sequence, the link-level facility changes from the working (WK) state to the connection-recovery UD-reception (CR2) state.

When the link-level facility has recognized the unconditional-disconnect-response sequence, the link-level facility changes from the working (WK) state to the connection-recovery UDR-reception (CR3) state.

When the link-level facility has determined that a link-signal error persists for longer than the link-interval duration, the link-level facility changes from the working (WK) state to the link-failure transmit-NOS (LF2) state.

LINK FAILURE STATE (LF1 AND LF2)

The link-level facility is in the link-failure (LF1 or LF2) state when the link-level facility recognizes an appropriate link-failure condition on the attached link such as a loss-of-signal or loss-of-sync condition. If the link-level facility is in the offline-transmit (OL1) state and is not interrogating the information received on the link (that is, the link-level facility is not prepared to leave the offline-transmit (OL1) state), then a link-failure condition is not recognized. There are two substates associated with the link-failure state: transmit OLS (LF1) and transmit NOS (LF2). The link-level facility can enter the link-failure state from any other state.

A link-level facility leaves the link-failure state (LF1 or LF2) when (1) no link-failure condition is recognized on its attached link, or (2) a condition is recognized which causes the link-level facility to enter the offline state.

CONNECTION RECOVERY STATE (CR1, CR2 AND CR3)

The link-level facility is in the connection-recovery (CR1, CR2 or CR3) state when the connection-recovery procedure is being performed. A link-level facility that is not in the offline-transmit (OL1) state and is not interrogating the information received on the link, enters the connection-recovery state when an appropriate condition that causes the connection-recovery procedure occurs. Unconditional Disconnect (UD) sequences are sent during the connection-recovery procedure to cause the removal of a dynamic connection between the link of a link-level facility or dynamic switch port and any other link. Connection recovery uses the interlocked exchanges of the unconditional-disconnect (UD) and unconditional-disconnect-response (UDR) sequences. There are three substates associated with the connection-recovery state: UD-transmission (CR1), UD-reception (CR2), and UDR-reception (CR3). The link-level facility can enter the connection-recovery state from any other state.

A link-level facility leaves the connection-recovery state when (1) the connection-recovery protocols are satisfied, or (2) a condition is recognized which causes the link-level facility to enter either the offline (OL1, OL2 or OL3) or the link-failure (LF1 or LF2) state.

OFFLINE STATE (OL1, OL2 AND OL3)

The link-level facility is in the offline state (OL1, OL2 or OL3) when the offline procedure is being performed. This typically occurs when the link-level facility or dynamic switch port is being powered on or off, or when the link address is being reset such as during initial microcode load (IML) of the system. Specifically, the link-level facility enters the offline (OL1, OL2 or OL3) state when (1) the offline sequence is received and recognized from the link, or (2) the link-level facility has initiated an offline operation by causing the transmission of the offline sequence on the link. There are three substates associated with the offline state: offline-transmit (OL1), offline-received (OL2), and wait-for-offline-sequence (OL3). The link-level facility can enter the offline state from any other state.

A link-level facility leaves the offline state when the offline protocols are satisfied.

When the link-level facility 70 is in one of its states, and an event occurs, the link-level facility 70 performs the action shown by the number in parentheses, and goes to the state indicated. For instance, when a (link failure is recognized) (event 11) and the link-level facility 70 is in the working (WK) state, the state changes to the link-failure transmit NOS (LF2) state and does action 6 (send NOS). The actions are defined as follows:

1. A link error is detected.
2. Send UDR sequence.
3. Send idle character(s).
4. Send UD sequence.
5. Send OLS sequence.
6. Send NOS sequence.

In addition, certain notes and symbols are shown in FIG. 7. These notes and symbols are:

& = The events are ignored until the link-level facility 70 determines it is time to leave the offline-transmit (OL1) state.

\* = This event can happen but no change in state or action is taken, that is, does nothing.

¢ = Detection of event 7 while in this state may be treated as no state change, or, optionally can cause UDR reception to be completed. If the unit performs this option, then state transitions occur as though the particular event occurred while in the IN state — = The event cannot happen while in the present state.

NOTES

1. When a link-level facility determines that an event internal to the channel or the control unit has occurred or the link-level facility intends to power off, it causes the offline procedure to be performed. The switching to offline through manual control has no effect in this state. The link-level facility ensures that switching to offline does not occur until all connections no longer exist and any I/O operations, either active or disconnected, are complete (that is, the link-level facility has entered the inactive state).

2. A link error is detected (action 1) if this event occurs and the UD sequence was not transmitted.

3. After a set number of consecutive idle characters have been recognized, the link-level facility initiates transmission of idle characters and considers connection recovery complete. The link-level facility can transmit a frame or a sequence after (a) it has transmitted a set number of consecutive idle characters, or (b) it has recognized an SOF delimiter followed by any valid transmission character.

4. The architecture that defines link-level functions, device-level functions, and serial recovery are used to determine the proper function that is to be performed as the result of the received or transmitted frame for the conditions present.

5. The link-interval duration starts timing when the not-operational sequence is no longer recognized and none of the other events occur.

6. The link-interval duration starts timing when the offline sequence is no longer recognized and none of the other events occur.

Frame transmission by the link-level facility 70 is permitted on a link when the state machine 82 is in either the inactive (IN) or the working (WK) state. When a frame is transmitted on a link, idle characters are discontinued only for the time necessary to transmit the frame. The transition from idle characters to frame transmission and the transition from frame transmission back to idle characters occur so that the appropriate transmission characters are always being transmitted on the link such that proper disparity is maintained. When successive frames are sent, the link-level facility sending the frames separates the successive frames by continuous sequences of idle characters as shown in FIG. 5.

Frame transmission begins when the first transmission character of the start-of-frame delimiter is sent and ends when the transmission character of the end-of-frame delimiter is sent. In the absence of errors, once transmission of a frame starts, the operation is synchronous and is not interrupted until the last transmission character of the end-of-frame delimiter is sent. After the end-of-frame delimiter is sent, idle characters are sent until the next frame or sequence is ready for transmission.

The link-level facility 70 can receive a frame anytime after the receiver 72 has achieved synchronization. After synchronization is achieved, the character boundaries of the transmission being received are established, which permits the receiver 72 to search for an ordered set that represents a start-of-frame delimiter. Frame reception starts upon the recognition by the receiver 72 of a start-of-frame delimiter that is followed by any valid transmission character. Frame reception, when started, continues until delimiter ordered set is recognized, two consecutive idle characters are recognized, a defined continuous sequence is recognized, a quantity of transmission characters that exceeds the maximum which can be accepted for the conditions present is recognized, or a loss-of-signal or loss-of-sync condition is detected. When frame reception is ended by other than an end-of-frame delimiter ordered set, that which has been received is not considered to be a frame and is discarded.

While we have illustrated and described the preferred embodiment of our invention, it is to be understood that we do not limit ourselves to the precise construction herein disclosed, and the right is reserved to all changes and modifications coming within the scope of the invention as defined by the appended claims.

Having thus described our invention, what we claim as new, and desire to secure by Letters Patent is:

1. A link-level facility for sending and receiving data transfers over a link in an input/output system, said link-level facility comprising:

continuous sequence generating means connected to said link for generating continuous sequences for transmission over said link from said link-level facility, said continuous sequence indicating the operating status of said link;

frame generating means connected to said link for generating frames for transmission over said link from said link-level facility;

synchronizing means connected to said continuous sequence generating means and said frame generating means for synchronizing the transmission of frames with the transmission of said continuous sequences such that said frames are intermediate successive ones of said continuous sequences;

receiving means connected to said link for receiving continuous sequences and frames transmitted over said link to said link-level facility; and state machine means connected to said receiving means, said frame generating means and said continuous sequence generating means, said state machine means for controlling said frame generating means and said continuous sequence generating means, said state machine having a recognition means connected to said receiving means for recognizing continuous sequences received by said receiving means from said link for determining if said link has a frame-transmitting status or a non-frame-transmitting status, a first state means connected to said frame generating means for allowing transmission of frames from said frame generating means over said link when said recognition means determines that the last continuous sequence received by said receiving means indicates said link has a frame-transmitting status, and a second state means connected to said frame generator for preventing transmission of frames from said frame generating means over said link when said recognition means determines that the last continuous sequence received by said receiving means indicates said link has a non-frame-transmitting status.

2. The link-level facility of claim 1 wherein said first state means includes enable means connected to said receiving means for enabling the receipt of frames by said receiving means from said link when said recognition means determines that the last continuous sequence received by said receiving means indicates that said link has a frame-transmitting status.

3. The link-level facility of claim 2 wherein said first state means comprises an inactive state means connected to said continuous sequence generating means for enabling said continuous sequence generating means to generate a continuous sequence of idle characters when said state machine is in an inactive state, and a working state means for receiving frames on said receiving means and transmitting frames from said frame generating means when said state machine is in a working state.

4. The link-level facility of claim 3 wherein said link-level facility includes state changing means connected to said inactive state means, said working state means and said receiving means, said state changing means for changing said state machine from said inactive state to said working state upon the receipt by said receiving means of a frame.

5. The link-level facility of claim 1 wherein the second state means of said state machine further comprises means for disabling the synchronizing of said synchronizing means such that only continuous sequences from said continuous sequence generating means are transmitted over said link from said synchronizing means.

6. The link-level facility of claim 5 wherein said second state means of said state machine includes a link-failure state means for entering a link failure state when a link failure is recognized, a connection-recovery state means for entering a link recovery state for performing a link recovery procedure and an offline state means for entering an offline state for performing an offline procedure.

7. The link-level facility of claim 6 wherein said offline state means includes inhibit means connected to said recognition means evaluating means for preventing said recognition means from recognizing link failures, frames, and continuous sequences.

8. The link-level facility of claim 6 wherein said state changing means is further connected to said recognition means for changing the state of said state machine means responsive to said recognition means, said state machine means being changed to said link-failure state by said state changing means responsive to the detection of a link-failure sequence by said recognition means, said state machine means being changed to said connection-recovery state by said state changing means responsive to the detection of a connection-recovery sequence by said recognition means, and the state machine being changed to said offline state by said state changing means responsive to the detection of an offline sequence by said recognition means.

9. The link-level facility of claim 8 wherein said continuous sequence generating means includes means for generating a link-failure sequence when said state machine is in said link-failure state, a connection-recovery sequence when said state machine is in said connection-recovery state, and an offline sequence when said state machine is in said offline state.

* * * * *